(12) United States Patent
Brunswig et al.

(10) Patent No.: US 9,536,222 B2
(45) Date of Patent: Jan. 3, 2017

(54) PROGRESS INFORMATION IN A SERVICE-ORIENTED ARCHITECTURE

(75) Inventors: Frank Brunswig, Heidelberg (DE); Guenter Pecht-Seibert, Mühlhausen (DE)

(73) Assignee: SAP SE, Walldorf (DE)

( * ) Notice: Subject to any disclaimer, the term of this patent is extended or adjusted under 35 U.S.C. 154(b) by 1238 days.

(21) Appl. No.: 12/647,732

(22) Filed: Dec. 28, 2009

(65) Prior Publication Data
US 2011/0161122 A1 Jun. 30, 2011

(51) Int. Cl.
G06F 9/44 (2006.01)
G06Q 10/00 (2012.01)
G06Q 10/10 (2012.01)
G06Q 10/06 (2012.01)

(52) U.S. Cl.
CPC .......... *G06Q 10/10* (2013.01); *G06F 8/20* (2013.01); *G06Q 10/063* (2013.01); *G06Q 10/063114* (2013.01); *G06Q 10/103* (2013.01)

(58) Field of Classification Search
CPC .............................................. G06Q 10/063114
USPC ............ 705/1.1, 7.11, 7.26, 14.34, 26.5, 50, 51, 705/65; 101/128.4; 709/232, 201, 203, 215, 709/224; 718/100; 719/315
See application file for complete search history.

(56) References Cited

U.S. PATENT DOCUMENTS

| | | | |
|---|---|---|---|
| 6,336,135 B1 * | 1/2002 | Niblett et al. | 709/215 |
| 6,615,231 B1 * | 9/2003 | Deen et al. | 709/201 |
| 6,654,726 B1 * | 11/2003 | Hanzek | 705/26.5 |
| 6,757,706 B1 * | 6/2004 | Dong et al. | 709/203 |
| 6,937,993 B1 * | 8/2005 | Gabbita et al. | 705/7.22 |
| 6,938,251 B1 * | 8/2005 | Chow et al. | 718/100 |
| 7,853,959 B2 * | 12/2010 | Agassi et al. | 719/319 |
| 2002/0078212 A1 | 6/2002 | Besaw et al. | |
| 2003/0037009 A1 * | 2/2003 | Tobin et al. | 705/65 |
| 2004/0168587 A1 * | 9/2004 | Esaki et al. | 101/128.4 |
| 2005/0027578 A1 * | 2/2005 | Chambers et al. | 705/8 |
| 2005/0055253 A1 * | 3/2005 | Sahni et al. | 705/7 |
| 2006/0143290 A1 * | 6/2006 | Dostert et al. | 709/224 |
| 2007/0016639 A1 * | 1/2007 | Mukundan et al. | 709/203 |
| 2007/0208587 A1 * | 9/2007 | Sitaraman | 705/1 |
| 2007/0214208 A1 * | 9/2007 | Balachandran | 709/201 |

(Continued)

OTHER PUBLICATIONS

IT Hit WebDAV for .NET; http://doc.webdaysystem.com/ITHit.WebDAV.Server.ResumableUpload.IResumableUpload.html; http://doc.webdaysystem.com/ITHit.WebDAV.Server.ResumableUpload.IUploadProgress.html; Oct. 25, 2008.*

(Continued)

*Primary Examiner* — Sujay Koneru
(74) *Attorney, Agent, or Firm* — Buckley, Maschoff & Talwalker LLC

(57) ABSTRACT

A system may include reception of an instruction to execute a business process from a client application, execution of the business process in a first software work process, and storage, during execution of the business process, of progress information associated with the business process within a memory. A system may further include reception, at a second software work process, of a request from the client application for progress information, retrieval, in the second software work process, of the progress information from the shared memory, reception, at the second software work process, of the progress information from the memory, and provision of the progress information to the client application from the second software work process.

18 Claims, 8 Drawing Sheets

(56) References Cited

U.S. PATENT DOCUMENTS

| | | | |
|---|---|---|---|
| 2008/0015996 A1* | 1/2008 | Notani | 705/50 |
| 2008/0208900 A1* | 8/2008 | Rapp | 707/103 Y |
| 2009/0164933 A1* | 6/2009 | Pederson et al. | 715/772 |
| 2009/0171893 A1* | 7/2009 | Gonzales et al. | 707/3 |
| 2010/0017252 A1* | 1/2010 | Chaar et al. | 705/9 |

OTHER PUBLICATIONS

Juniper Networks, Inc.; Complying with XML and NETCONF Conventions; http://www.juniper.net/techpubs/software/junos/junos102/netconf-guide/id-10236493.html; Feb. 13, 2006.*

E. James Whitehead, Jr. et al., "WEBDAV:IETF Standard for Collaborative Authoring on the Web", IEEE Internet Computing, Sep.-Oct. 1998, (pp. 34-40, 7 pages total).

"Non-Final Office Action", dated May 17, 2012, for U.S. Appl. No. 12/647,815, entitled "Progress-Driven Progress Information in a Service-Oriented Architecture", 9pgs.

* cited by examiner

400

SAP Business
ByDesign

Advanced  Logout

New Employee Information

Name [ John Doe ]

Department [ Sales ]     Division [ Hardware ]

| Hire Date | Contract (Y/N) | Full-time (Y/N) | Salary | Home Address | Citizenship |
|---|---|---|---|---|---|
| 7/14/08 | N | Y | 50,000 | 123 Main | German |

[ Hire Employee ]   [ Cancel ]

PROGRESS INFORMATION IN A SERVICE-ORIENTED ARCHITECTURE

CROSS REFERENCE TO RELATED APPLICATIONS

This application is related to U.S. patent application Ser. No. 12/647,815 filed on even date herewith and entitled "Process-Driven Progress Information in a Service-Oriented Architecture"

FIELD

Some embodiments relate to a service-oriented architecture to provide software services. More specifically, some embodiments relate to the provision of progress information to a service client during service fulfillment.

BACKGROUND

FIG. 1 is a block diagram of prior art system 100. System 100 includes client 110 and service-oriented architecture 120. Client 110 may comprise a Web browser to access services provided by service-oriented architecture 120 via HyperText Transport Protocol (HTTP) communication.

For example, a user may manipulate a user interface of client 110 to input an instruction (e.g., update inventory). Client 110, in response, may transmit a corresponding HTTP service request to service-oriented architecture 120 as illustrated. Service-oriented architecture 120 conducts any processing required by the request (e.g., updating a list of inventory) and, after completing the processing, provides a response to client 110.

Client 110 does not receive any indication from service-oriented architecture 120 during the above-mentioned processing. Accordingly, after inputting the instruction and before receiving the response, the user is left to wonder whether any processing is occurring as a result of the instruction, whether service-oriented architecture 120 is non-responsive, or whether a network error has occurred between client 110 and service-oriented architecture 120. Service requests which require lengthy processing exacerbate this dilemma.

Due to the request/response nature of HTTP, the foregoing cannot be addressed simply by programming service-oriented architecture 120 to send some sort of progress indicator to client 110. Accordingly, what is needed is a system to provide meaningful progress information to a client of a service-oriented architecture.

BRIEF DESCRIPTION OF THE DRAWINGS

FIG. 4 is a view of a user interface according to some embodiments.

FIG. 7 is a view of a user interface presenting progress information according to some embodiments.

DETAILED DESCRIPTION

Figure 1:
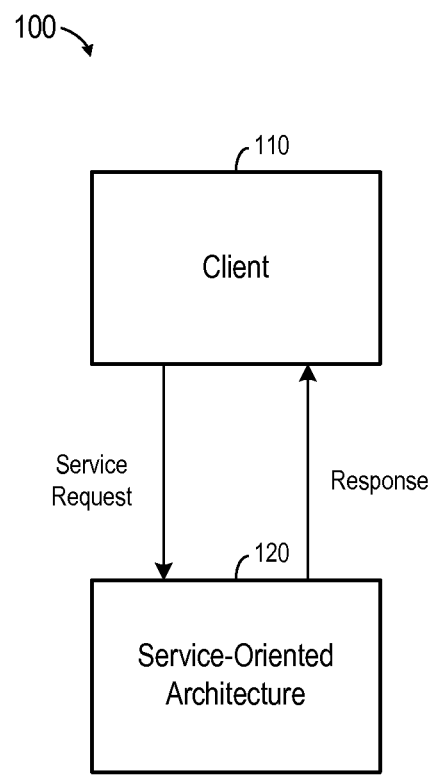
FIG. 1 is a block diagram of a prior art system.
Figure 2:
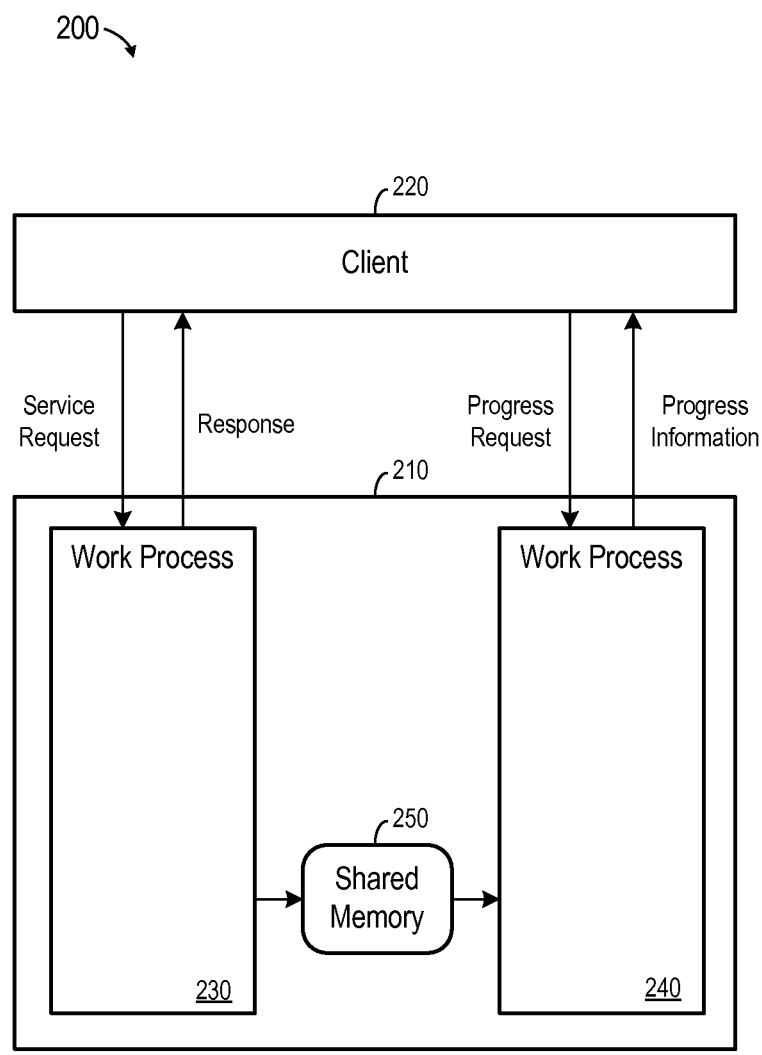
FIG. 2 is a block diagram of a system according to some embodiments.

FIG. 2 is a block diagram of system 200 according to some embodiments. System 200 includes business process platform 210 and client 220. Business process platform 210 may comprise a service-oriented architecture (e.g., SAP Business ByDesign®, Salesforce). In this regard, FIG. 2 represents a logical architecture for describing processes according to some embodiments, and actual implementations may include more or different components arranged in other manners.

Generally, business process platform 210 may provide services to client 220 according to some embodiments. Such services may comprise Web services and client 220 may therefore comprise a Web client. Examples of a Web client include, but are not limited to, a Web browser, an execution engine (e.g., JAVA, Flash, Silverlight) to execute associated code in a Web browser, and a dedicated standalone application.

Business process platform 210 includes software work process 230 and software work process 240. Each of software work processes 230 and 240 may independently execute tasks required of business process platform 210. Business process platform 210 may support more than two simultaneous software work processes according to some embodiments.

Business process platform 210 also includes shared memory 250, which may be implemented in Random Access Memory, persistent storage (e.g., hard disks) and/or in any other suitable electronic memory. Each of software work processes 230 and 240 is in (i.e., capable of) communication with shared memory 250.

Figure 3:
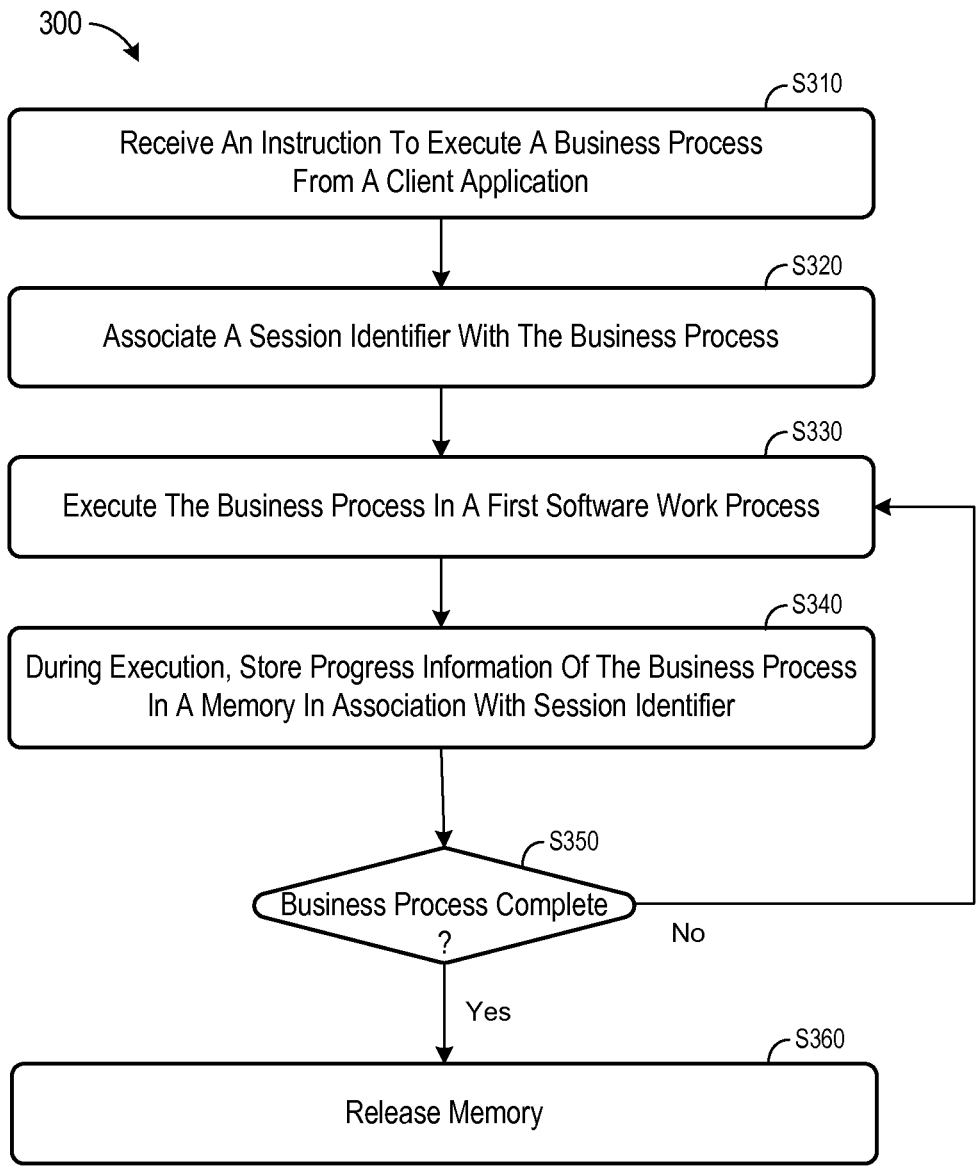
FIG. 3 is a flow diagram of a process according to some embodiments.

FIG. 3 is a flow diagram of process 300 to provide progress information according to some embodiments. Platform 210 may execute process 300 as will be described below, but embodiments are not limited thereto. In this regard, process 300 may be executed by any combination of hardware and/or software. Process 300 may be embodied in program code stored on a tangible medium and executable by a computer to provide the functions described herein.

Initially, an instruction to execute a business process is received from a client application at S310. The instruction may comprise a Web service call according to some embodiments. The instruction may be transmitted by the client application in response to user manipulation of a user interface presented by the client application.

FIG. 4 is an outward view of user interface 400 for describing an example of process 300 according to some embodiments. Client 220 may display user interface 400 on a hardware display to a user. It will be assumed that user interface 400 is intended to collect information used to create a record of a new employee and other associated records within business process platform 210.

Therefore, prior to S310, the user navigates to user interface 400 and completes the inputs fields thereof. The user then selects "Hire Employee" icon 410, causing client 220 to transmit an instruction to business process platform 210 (e.g., via HTTP) to create a new employee. This instruction is received by business process platform 210 at S310.

The instruction may include a session identifier (e.g., cookie) per the HTTP protocol. Business process platform 210 assigns the instruction to work process 230 and the session identifier is associated with the "create employee" business process to be performed by work process 230.

Accordingly, work process 230 executes the business process at S330. Execution of the business process may include, but is not limited to, instantiating, populating and manipulating business objects within business process platform 210. A business object may comprise a class defining data and methods associated with a business entity. For example, S330 may include creation of an employee business object, an employment business object, a work agreement business object, a compensation agreement business object, etc., as well as definition of dependencies therebetween.

During execution of the business process, work process 230 stores corresponding progress information in shared memory 250. Detailed examples of generation and storage of the progress information are provided below. According to some embodiments, the progress information is stored in shared memory 250 in association with the session identifier. Such storage enables retrieval of the progress information from shared memory 250 based on the session identifier.

Next, at S350, it is determined whether the business process is complete. If not, flow returns to S330 to continue execution of the business process as described above. Stated differently, flow cycles between S330 and S340 until the business process is complete.

During the aforementioned cycling between S330 and S340, progress information need not be stored into shared memory 250 continuously. Work process 230 may store progress information at S340 only upon determining, based on the ongoing execution of the business process, that the progress information should be updated. The updated progress information is also stored in association with the session identifier at S340. It may be preferable to overwrite previously-stored progress information to avoid confusion as to which is most recent.

Process 300 continues as described above until it is determined at S350 that the business process is complete. In response, work process 230 may issue an instruction at S360 to release the area of shared memory 250 reserved for storing progress information.

Figure 5:
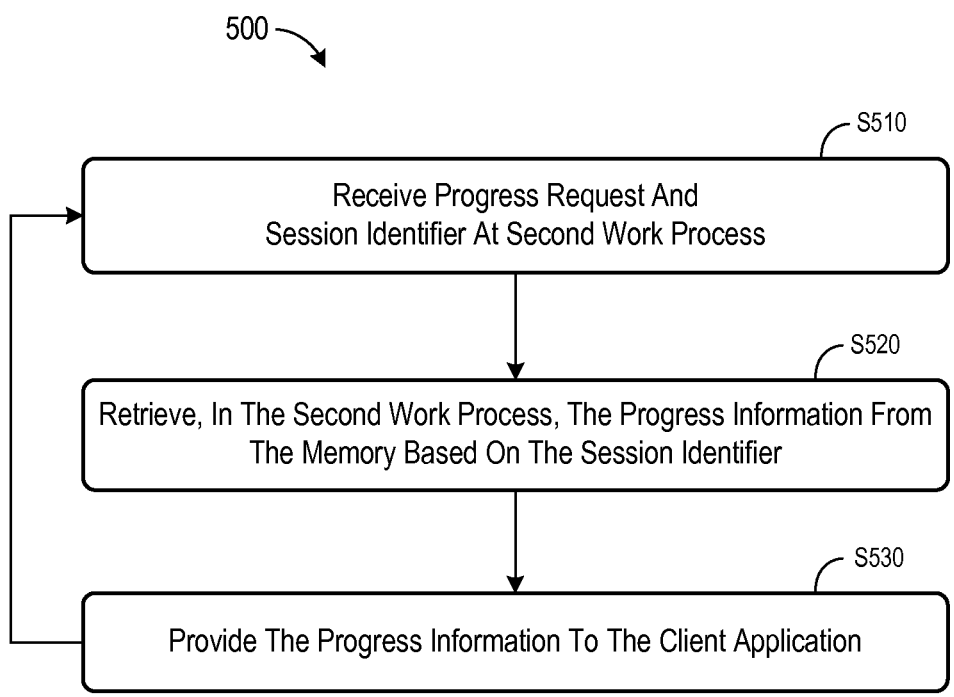
FIG. 5 is a flow diagram of a process according to some embodiments.

FIG. 5 is a flow diagram of process 500 to provide progress information according to some embodiments. Platform 210 may also execute process 500 as will be described below, but embodiments are not limited thereto.

Process 500 may be performed in parallel with process 300 of FIG. 3. Generally, as progress information is stored and updated in a shared memory according to process 300, the progress information may be retrieved therefrom and provided to a client application according to process 500. In some embodiments, the progress information is stored and updated by a first software work process (e.g., work process 230) and is retrieved and provided to the client application by a second software work process (e.g., work process 240).

Initially, at S510, a progress request and a session identifier are received from a client application. For example, client 220 may send a progress request and the session identifier to business process platform 210 from the same client session used to send the instruction received at S310. Client 220 may send the progress request at a pre-designated interval (e.g., 1 second) after sending the instruction.

Business process platform 210 assigns the progress request to work process 240 and, at S520, work process 240 retrieves the progress information from shared memory 250. Work process 240 may use the received session identifier as a key to retrieve the progress information from shared memory 250 at S520.

Next, at S530, second work process 240 provides the progress information to the client application. Such provision may proceed according to the standard HTTP request/response protocol. More specifically, the progress information is sent via an HTTP response corresponding to the HTTP progress request received at S510.

Figure 6:
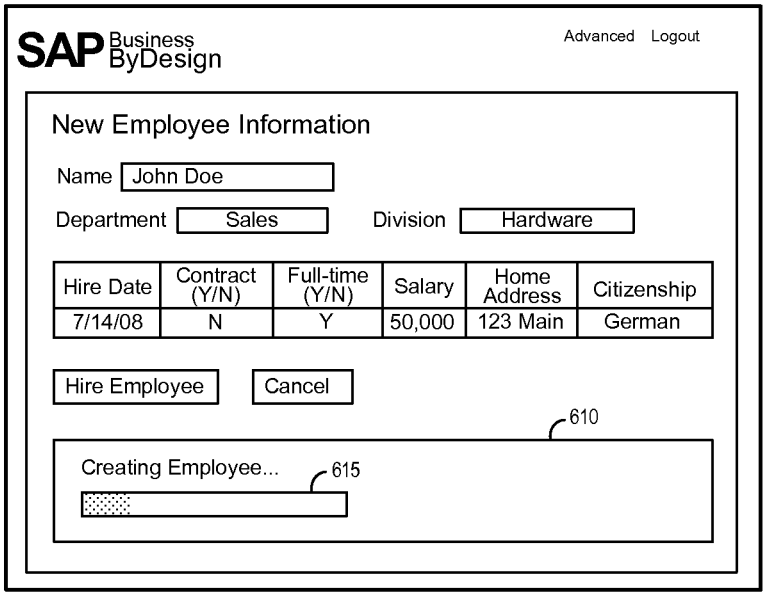
FIG. 6 is a view of a user interface presenting progress information according to some embodiments.

FIG. 6 is a view of user interface 600 displayed by client 220 after S530 according to some embodiments. User interface 600 is identical to user interface 400 of FIG. 4 except for the appearance of progress information window 610. Window 610 includes the text "Creating Employee . . . " which may have been provided to client 220 at S530 of process 500. Window 610 also includes progress bar 615 to illustrate that the provided progress information may also (or alternatively) include an indication of the extent to which the executing business process has completed. Any other information indicative of execution progress may be provided at S530 according to some embodiments. Moreover, the provided progress information may be presented by the client application in any suitable manner.

Flow returns from S530 to S510 to await another progress request. If another request and session identifier are received, progress information is again retrieved from shared memory 250 at S520 as described above. Due to concurrent execution of process 300, the now-retrieved progress information may be different from the progress information retrieved in response to the last progress request.

Figure 7:
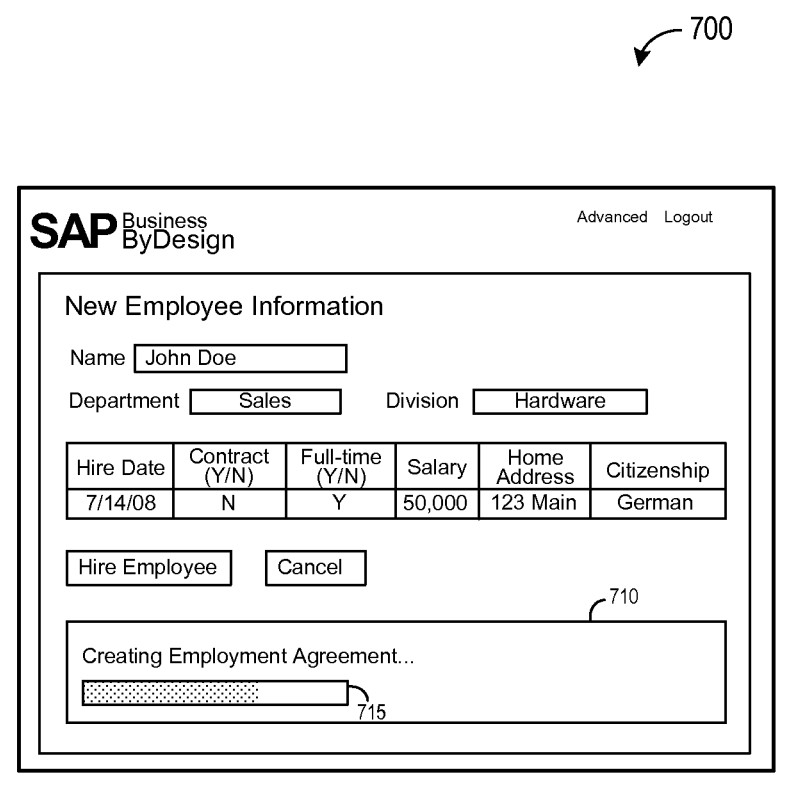

The now-retrieved progress information is provided to the client application at S530. Continuing with the present example, FIG. 7 is a view of user interface 700 displayed by client 220 after S530 according to some embodiments. User interface 700 includes progress information window 710, the contents of which have changed since the time represented in FIG. 6.

Specifically, window 710 includes the text "Creating Employment Agreement . . . " and progress bar 715 is more advanced than shown in FIG. 6. User interface 700 thereby provides a visual indication of advancing progress according to some embodiments. Again, any other information indicative of execution progress may be provided at S530, and that information may be presented by the client application in any suitable manner.

Figure 8:
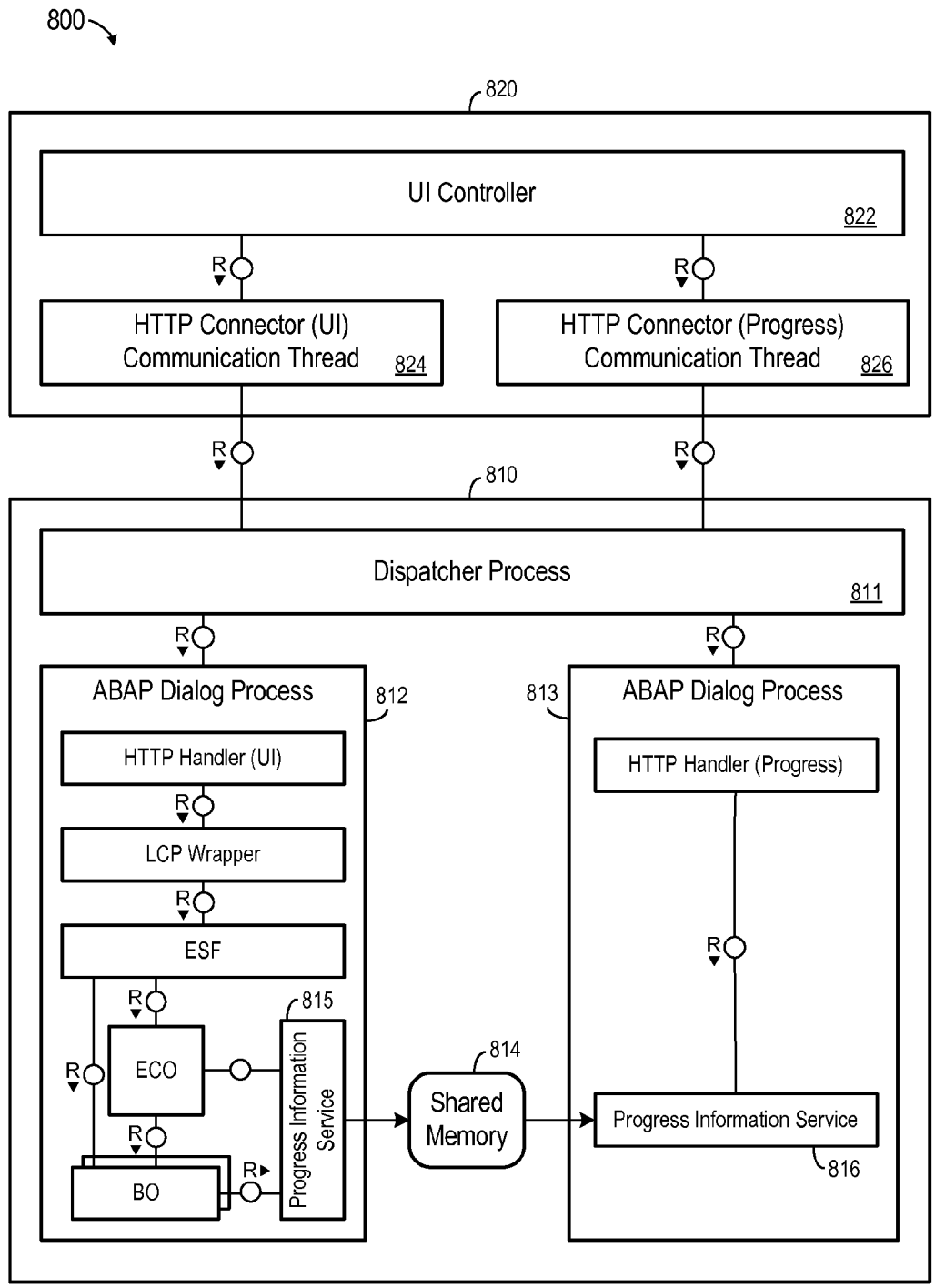
FIG. 8 is a detailed block diagram of a system according to some embodiments.

FIG. 8 is a detailed block diagram of system 800 according to some embodiments. System 800 includes business process platform 810 and client 820. System 800 may therefore comprise a specific implementation of system 200, and business process platform 810 and client 820 may execute the functions attributed above to business process platform 210 and client 220, respectively.

Business process platform 810 may comprise a service-oriented architecture to provide services to client 820 and to other clients according to some embodiments. Business process platform 810 includes dispatcher process 811 to receive HTTP requests from client 820 and to forward the requests to appropriate work processes. For example, dispatcher process 811 may receive an HTTP request associated with user interface floorplan functionality and may dispatch the request to ABAP dialog process 812. Based on the type of request, ABAP dialog process 812 calls an HTTP Handler (UI).

Local Client Proxy (LCP) Wrapper of ABAP dialog process 812 forwards the request to an Enterprise Services Framework (ESF). As is known in the art, the ESF manipulates business objects (BOs) to provide enterprise services. The ESF may also issue requests to an Enterprise Controller Object (ECO) associated with the currently-viewed UI floorplan. The ECO may provide additional business knowledge and functionality behind the operation of the UI floorplan.

Progress information service 815, as will be described in detail below, receives information generated by one or more BOs of process 812 and provides the information to the ECO. Progress information service 815 may also receive progress information from the ECO and store the progress information in shared memory. Progress information service 815 may provide an application programming interface of static class methods to facilitate this operation according to some embodiments.

Upon receiving a request for progress information, dispatcher process 811 may dispatch the request to ABAP dialog process 813. In turn, ABAP dialog process 813 calls an HTTP Handler (Progress). As will be described below, the HTTP Handler (Progress) uses progress information service 816 to retrieve the progress information from shared memory 814 and returns the progress information to client 820.

Client 820 may comprise a Web client as described above. UI controller 822 of client 820 may comprise a software thread to control a user interface displayed by client 820. Requests related to user interface functionality are passed from UI controller 822 to HTTP connector UI communication thread 824 and on to platform 810. Similarly, UI controller 822 passes requests for progress information to HTTP connector progress communication thread 826.

System 800 may execute processes 300 and 500 according to some embodiments. In a specific example, an instruction to execute a business process associated with a UI floorplan is passed from UI controller 822 to HTTP connector UI communication thread 824, to dispatcher process 811, and is received by dialog process 812 at S310.

The ECO may then call an interface of progress information service 815 to register therewith. Registration informs progress information service 815 to provide the ECO with any progress-related information received from the BOs during execution of the business process. The following interface may be used:

```
CL_CONTROLLER_PROGRESS_INFO=>
SET_CONTROLLER_OBJECT
    EXPORTING CONTROLLER_OBJECT  TYPE  REF  TO
    IF_CONTROLLER_PROGRESS_INFO
```

Next, the ESF, BOs and ECO of process 812 operate to execute the business process at S330. During such execution, one or more BOs may generate progress-related information and provide this information to progress information service 813 via an interface such as:

```
CL_PROVIDER_PROGRESS_INFO=>SET_PROGRESS_INFO
    EXPORTING   PROGRESS_INFO_TYPE   TYPE
                PROGRESS_INFO_TYPE
                PROGRESS_INFO_VALUE TYPE STRING,
``` where PROGRESS_INFO_TYPE describes the type of information and PROGRESS_INFO_VALUE provides a corresponding value. The type and value of the information may comprise low-level technical information that may not be useful to an end-user of client 820.

Due to registration of the ECO, progress information service 815 performs a callback to the ECO upon receipt of the information from the one or more BOs. The callback may be implemented as follows:

```
CL_PROVIDER_PROGRESS_INFO=>SET_PROGRESS_INFO
    EXPORTING   PROGRESS_INFO_TYPE   TYPE
                PROGRESS_INFO_TYPE
                PROGRESS_INFO_VALUE TYPE STRING
```

Based on the information received in the following callback, and based on its knowledge of the overall business process being executed, the ECO determines, at S340, whether progress information should be stored in shared memory 814. If so, the ECO also determines the actual progress information to be stored. In this regard, each BO is unaware of its role or its temporal position in the currently-executing business process. Instead, each BO simply provides low-level information indicative of its current state. The ECO gathers this information (via progress information service 815) to determine progress information associated with the current process.

The ECO calls another interface of progress information service 815 to store progress information in shared memory 814. The foregoing is an example of such an interface according to some embodiments:

```
CL_CONTROLLER_PROGRESS_INFO=>SET_PROGRESS_INFO
    EXPORTING   COOKIE_NAME            TYPE   STRING
                COOKIE_VALUE           TYPE   STRING
                PROGRESS_PERCENTAGE    TYPE   I
                PROGRESS_TEXT          TYPE   STRING,
``` where COOKIE_NAME contains the name of a cookie used for UI session management, COOKIE_VALUE contains the value of the cookie used for UI session management, PROGRESS_PERCENTAGE describes the extent (in percent) to which the current business process is complete, and PROGRESS_TEXT contains a description of the progress (e.g., "Creating Employee . . . ").

The progress description may be dependent on the language governing the current session. Accordingly, the ECO may select a particular progress description from a database or other structure depending upon the governing language.

Turning to process 500, after receiving a request to retrieve progress information at S510, the HTTP Handler (Progress) of process 813 may call an interface of progress information service 816 in order to retrieve the progress information:

```
CL_CONTROLLER_PROGRESS_INFO=>GET_PROGRESS_INFO
    IMPORTING   COOKIE_NAME            TYPE   STRING
                COOKIE_VALUE           TYPE   STRING
                PROGRESS_PERCENTAGE    TYPE   I
                PROGRESS_TEXT          TYPE   STRING,
```

In response, progress information service 816 retrieves the progress information (i.e., PROGRESS_PERCENTAGE and PROGRESS_TEXT) from shared memory 814 at S520 using COOKIE_NAME and COOKIE_VALUE as a key. The progress information is returned to the HTTP Handler (Progress) and then to client 820 at S530.

Once the ECO determines that the business process is completed at S350, the ECO may call the following interface at S360 to reset shared memory 814:

```
CL_CONTROLLER_PROGRESS_INFO=>RESET
    EXPORTING   COOKIE_NAME    TYPE   STRING
                COOKIE_VALUE   TYPE   STRING
```

Some embodiments of the foregoing may therefore efficiently provide progress information to an end-user in a service-oriented architecture.

Each system described herein may be implemented by any number of devices in communication via any number of other public and/or private networks. Two or more of devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Zip™ disk, magnetic tape, and solid state RAM or ROM memories. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A method comprising:
   receiving, from a client application, a first request to execute a business process having a plurality of software work processes;
   during execution of the business process:
   receiving information at a progress information service, the information generated by a first software work process of the plurality of software work processes;
   providing the received information to an enterprise controller object (ECO), the ECO including knowledge of the executing business process;
   the progress information service receiving second information from a second software work process of the plurality of software work processes, and providing the second information to the ECO;
   the ECO determining, based on the ECO knowledge and information provided to the ECO in a callback from the progress information service, to store progress information in a shared memory by overwriting previously-stored content of the shared memory; and
   during execution of the business process receiving, at a third software work process, a second request for the determined progress information,
   retrieving by the third software work process, the determined progress information,
   and before a response is provided to the first request providing the determined progress information to the client application.

2. The method according to claim 1, wherein storing the determined progress information within the shared memory comprises storing a session identifier associated with the business process in association with the determined progress information in the shared memory, and
   wherein retrieving the determined progress information from the shared memory comprises retrieving, by the third software work process, the determined progress information from the memory based on the session identifier.

3. The method according to claim 2, further comprising:
   storing a second set of determined progress information within the shared memory in association with the session identifier, the second set of determined progress information overwriting previously-stored progress information content of the shared memory; and
   during execution of the business process, receiving, at the third software work process, a third request for the determined progress information,
   retrieving, by the third software work process, the second set of determined progress information,
   and before providing a response to the first request, providing the second set of determined progress information to the client application.

4. The method according to claim 1, further comprising:
   storing a second set of determined progress information within the shared memory in association with the session identifier, the second set of determined progress information overwriting previously-stored progress information content of the shared memory; and
   during execution of the business process, receiving, at the third software work process, a third request of the request/response protocol from the client application, the third request comprising a request for progress information,
   retrieving, by the third software work process, the second set of determined progress information,
   and before providing a response to the first request, providing the second set of determined progress information to the client application.

5. The method according to claim 1, wherein the first request comprises a Web service call.

6. The method according to claim 1, further comprising:
   registering the enterprise controller object with the progress information service of the first work process; and
   the progress information service providing the enterprise controller object progress information generated by one or more business objects of the executing business process.

7. A non-transitory computer-readable medium storing program code executable by a computer to:
   receive, from a client application, a first request to execute a business process having a plurality of software work processes;
   during execution of the business process:
   receive information at a progress information service, the information generated by a first software work process of the plurality of software work processes;
   provide the received information to an enterprise controller object (ECO), the ECO including knowledge of the executing business process;
   receive second information at the progress information service from a second software work process of the plurality of software work processes, and provide the second information to the ECO;
   the ECO determining, based on the ECO knowledge and information provided to the ECO in a callback from the progress information service, to store progress information in a shared memory, the determined progress information overwriting previously-stored content of the shared memory; and
   during execution of the business process receive, at a third software work process, a second request for the determined progress information,
   retrieve, by the third software work process, the determined progress information,
   before providing a response to the first request, provide the determined progress information to the client application.

8. The medium according to claim 7, wherein the code executable to store the progress information within the memory comprises code executable to store a session identifier associated with the business process in association with the determined progress information in the shared memory, and wherein the code executable to retrieve the progress information from the shared memory comprises code executable to retrieve, by the third software work process, the determined progress information from the shared memory based on the session identifier.

9. The medium according to claim 8, further comprising program code executable by a computer to:

store a second set of determined progress information associated with the business process within the shared memory in association with the session identifier, the second set of determined progress information overwriting previously-stored progress information content of the shared memory; and during execution of the business process, receive, at the third software work process, a third request for progress information, retrieve, by the third software work process, the second set of determined progress information from the shared memory based on the session identifier, and before providing a response to the first request, provide the second set of determined progress information to the client application.

10. The medium according to claim 7, further comprising program code executable by a computer to:

store a second set of determined progress information within the shared memory, the second set of determined progress information overwriting previously-stored progress information content of the shared memory; and during execution of the business process, receive, at the third software work process, a third request for progress information, retrieve, by the third software work process, the second set of determined progress information, and before providing a response to the first request, provide the second set of determined progress information to the client application.

11. The medium according to claim 7, further comprising program code executable by a computer to:

register the enterprise controller object with the progress information service of the first work process; and cause the progress information service to provide the enterprise controller object progress information generated by one or more business objects of the executing business process.

12. A system comprising:

a client application configured to present a user interface and to receive, via the user interface, a first request to execute a business process having a plurality of software work processes; and a business process platform comprising;

a shared memory;

a first software work process of the plurality of software work processes in communication with the shared memory, the first software work process configured to receive the first request from the client application, to execute the business process and, during execution of the business process, to store progress information associated with the business process within the shared memory, the storage of the progress information overwriting content of the shared memory;

the first software work process including:

a progress information service configured to receive information generated by the first software work process, and to provide the received information to an enterprise controller object (ECO), the ECO including knowledge of the executing business process;

the progress information service receiving second information from a second software work process of the plurality of software work processes, and providing the second information to the ECO;

the ECO configured to obtain the received information from the progress information service, and determine, based on the ECO knowledge and information provided to the ECO in a callback from the progress information service, to store progress information in a shared memory by overwriting previously-stored content of the shared memory; and a third software work process in communication with the shared memory, the third software work process configured to receive a second request for progress information, to retrieve the determined progress information from the shared memory during execution of the business process, and, during execution of the business process and before a response to the first request is provided, to provide the determined progress information to the client application in response to the second request.

13. The system according to claim 12, wherein storage of the determined progress information within the shared memory comprises storage of a session identifier associated with the business process in association with the determined progress information in the shared memory, and retrieval of the determined progress information from the shared memory comprises retrieval of the determined progress information from the shared memory based on the session identifier.

14. The system according to claim 13, the first work process further configured to store, during execution of the business process, a second set of determined progress information associated within the shared memory in association with the session identifier, and the third work process further configured to receive, during execution of the business process, a third request for progress information, to retrieve the second set of determined progress information from the shared memory based on the session identifier during execution of the first business process, and to provide, during execution of the business process and before a response to the first request is provided, the second set of determined progress information to the client application in response to the third request.

15. The system according to claim 12, the first work process further configured to store, during execution of the business process, a second set of determined progress information associated with the business process within the shared memory, the second set of determined progress information overwriting previously-stored progress information content of the shared memory; and the third work process further configured to receive a third request for progress information, to retrieve the second set of determined progress information from the shared memory during execution of the first business process, and, during execution of the business process and before a response is provided to the first request, to provide the second set of determined progress information to the client application from the third software work process in response to the third request.

16. The system according to claim 12, wherein the business process platform comprises a service-oriented architecture and the request comprises a Web service call.

17. The system according to claim 12, the business process platform further comprising:
- one or more business objects associated with the business process to generate information during execution of the business process; and
- a user interface controller object associated with the user interface, the user interface controller object to receive the generated information and to determine the progress information based on the information.

18. The system according to claim 12, the business process platform further comprising:
- the progress information service configured to store the determined progress information within the shared memory, the storage of the determined progress information overwriting previously-stored content of the shared memory.

\* \* \* \* \*